Jan. 3, 1928.

J. A. STEVENS 1,655,204

CUSHIONING MEANS FOR VEHICLES

Filed Oct. 5, 1925

Inventor
John A. Stevens
by Roberts, Roberts & Cushman
Attys.

Jan. 3, 1928.

J. A. STEVENS 1,655,204

CUSHIONING MEANS FOR VEHICLES

Filed Oct. 5, 1925        2 Sheets-Sheet 2

Inventor;
John A. Stevens,
by Roberts, Roberts & Cushman,
Att'ys.

Patented Jan. 3, 1928.

1,655,204

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF MASSACHUSETTS.

CUSHIONING MEANS FOR VEHICLES.

Application filed October 5, 1925. Serial No. 60,373.

This invention relates to a shock absorber adapted to be used in conjunction with and supplemental to the usual springs of a vehicle having compensator or equalizing means for distributing the shock received by one portion of the vehicle over the entire vehicle as a unit.

While shock absorbers located at the front and rear of vehicles effectively serve to soften and neutralize the thrust from a shock so that no sudden or sharp blow is transmitted to the occupants of the vehicle, the responsiveness of the shock absorbers at each end is so pronounced that the action necessary to overcome the thrust of the shock induces a rising and falling movement at each end of the vehicle periodic with the shocks received so that it frequently happens that the ends of the vehicle do not move in unison and the occupants experience an undulating or loping movement which while not sharp or sudden is nevertheless annoying and disagreeable.

Objects of this invention are to overcome the above mentioned defects by providing a shock absorber with compensator or equalizer means whereby the thrust received from a shock sustained at one end or any portion of the vehicle is correspondingly transmitted to the other end and other portions thereof so that the vehicle will rise and fall as a unit with all portions constantly maintained in the same approximate plane; to provide a vehicle with shock absorbers of the pneumatic type located adjacent each wheel whereby the increased fluid pressure in one of said shock absorber elements at one corner of the vehicle due to the thrust of a shock is transmitted to the other of said shock absorber elements at other corners of the vehicle so that said thrust is received with the same force at each corner thereof; and to provide a vehicle with a plurality of shock absorbing elements at each end thereof having equalizer or compensating means for evenly distributing the thrust from a shock at one portion of the car to opposed portions of the car without in any way interfering with the ability of said shock absorbing elements to soften and neutralize shocks:

In order that the above enumerated objects may be accomplished the vehicle is provided with shock absorbing elements preferably of the pneumatic type adjacent each wheel of the car. Each shock absorbing element comprises a body portion having a cylinder which receives a pneumatic bag inflated to the desired pressure depending on the weight of the car and a plunger working independently of or in parallel with helical springs movable within said cylinder and adapted to compress the inflated bag on its upward movement. The body of the shock absorber carrying the cylinder is attached directly to the chassis of the vehicle while the plunger or disk working on the inflated bag through its piston rod is attached to the spring of the vehicle so that the usual connection between the spring and frame or chassis of the vehicle is eliminated and the shock absorbing element mounted directly therebetween. When the vehicle sustains a shock the plunger or disk moves upwardly in the pneumatic cylinder and thus serves to counteract, neutralize and equalize the the shock so that it is transmitted to the vehicle or occupants thereof with little or no force. In order to transmit the force of a shock received by one end or portion of the car to the other end or portions thereof so that all parts of the car similarly react to a shock received by any other part of the car within the same shock period each shock absorber in the front is connected by a pipe or flexible tubing to the corresponding rear shock absorber with connections between the front shock absorbing elements and also between the rear shock absorbing elements so that the increased pressure in one pneumatic or fluid cylinder is directly transmitted to the corresponding pneumatic or fluid cylinder in the rear and all other cylinders with the result that the shock is equally distributed throughout the various parts of the car and all parts similarly react to the shock at substantially the same time. Inasmuch as the pressure in the front shock absorbing elements may be different from the desired pressure in the rear elements, suitable control valves are provided in the pipe lines to maintain the normal pressures under normal load constant.

For purposes of illustration the invention is shown in the accompanying drawings forming a part of the specification, in which.

Figure 1:
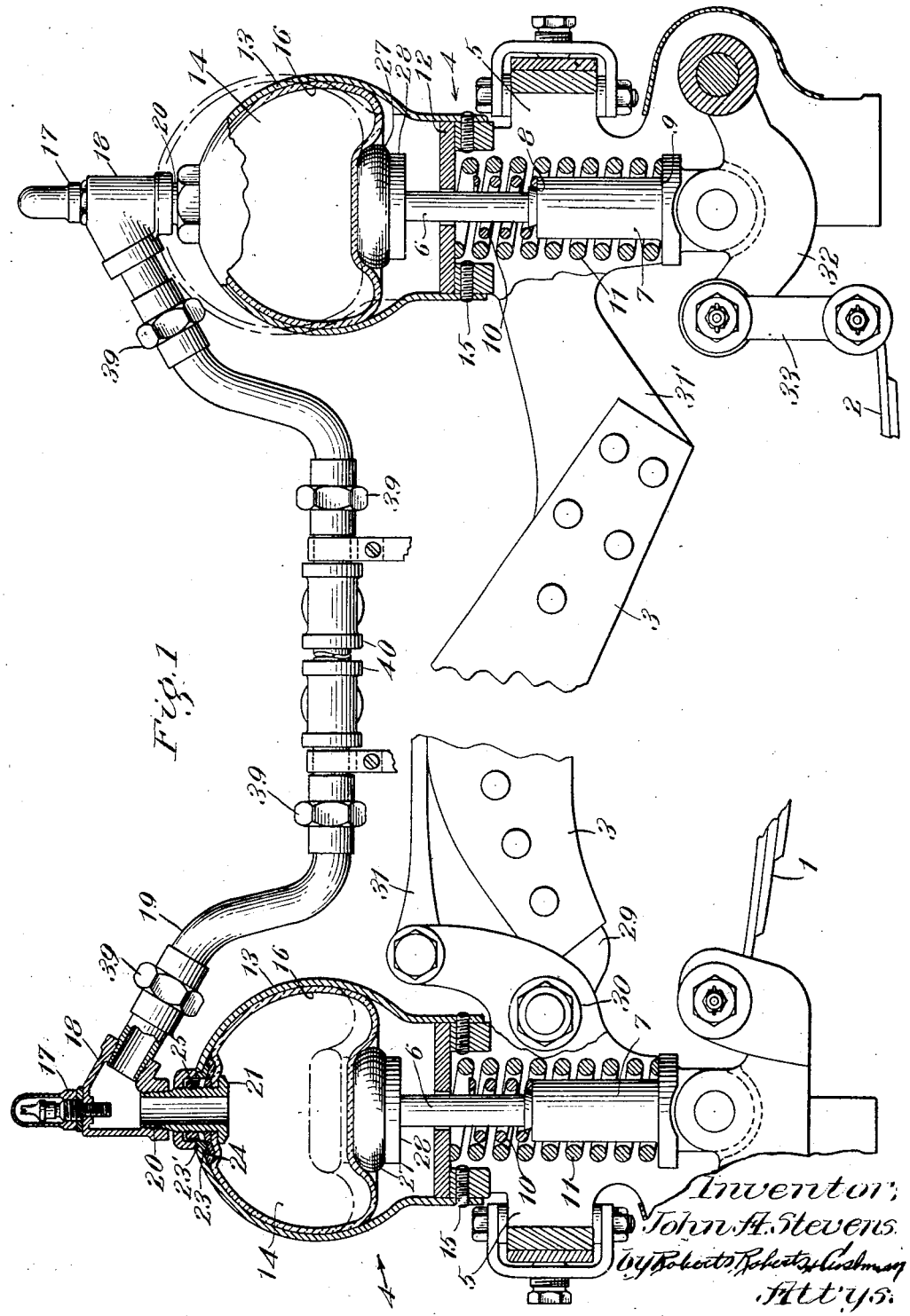
Fig. 1 is a side elevational view of front and rear shock absorbing elements showing the connections therebetween with certain parts of the shock absorbers in section.
Figure 3:
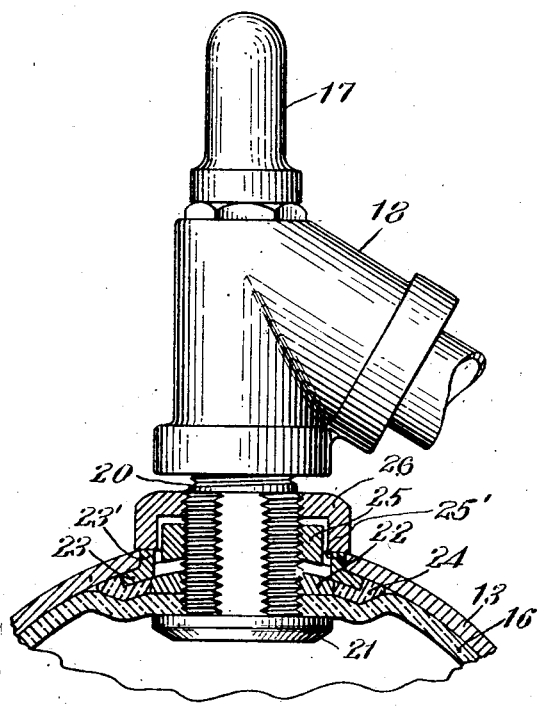
Fig. 3 is an enlarged section of the connection means between the tubing and compression chamber.
Figure 4:
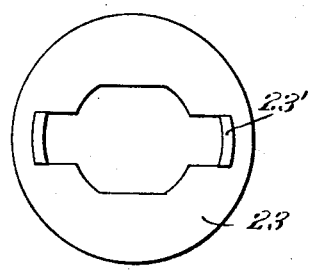
Fig. 4 is a plan view of the locking washer shown in Fig. 3.

As illustrated in Fig. 1 of the drawing the numerals 1 and 2 designate the usual front and rear semi-elliptic springs mounted on the front and rear axles, respectively of a vehicle and adapted to support the usual chassis or frame 3. In accordance with this invention shock absorbing elements designated as a whole by the numeral 4 are inserted between one end of each leaf spring and the chassis so that ordinarily two front and two rear shock absorbing elements are provided on each vehicle. However, as many shock absorbing elements as the exigencies of use demand may be provided. Each shock absorber comprises a body portion 5 adapted to enclose a plunger rod 6 which is attached to a sleeve 7 at its lower end. The sleeve 7 has on its exterior surface spaced shoulders 8 and 9 forming seats for the coiled springs 10 and 11 respectively. A washer 12 which is rigidly attached to the upper end of the body portions 5 through the medium of screws or other suitable attaching means receives and centers the plunger rod 6 relatively to the spherical casing or cylinder 13 which forms a compression chamber 14 surrounding the upper end of the body portion 5 and enclosing said washer 12. The lower end of the casing 13 is rigidly attached to the upper peripheral end of the body portion 5 through a series of screws 15. Enclosed within the casing 13 is an inner casing 16 of rubber or suitable material adapted to be inflated through the valve 17. The valve 17 is adapted to be mounted in a Y branch 18 which forms a connection for one end of the tubing 19 and the stem 20 extending through the casings 13 and 16 into the compression chamber 14. The stem 20 as best illustrated in Fig. 3 has an annular flange 21 on its lower end which seats against the inner surface of the casing 16 adjacent the opening receiving said stem. A washer 22 surrounds the stem 20 and seats on the outer surface of casing 16 adjacent the opening receiving said stem. A lock washer 23 having upstanding lugs 23′ and an opening having flat sides corresponding in shape to the outer surface of the stem 20 so that relative movement between said stem and washer is prevented rests on a washer 24 preferably of rubber and the washer 22, said washer 24 being in surrounding relation to and forming an extension of washer 22.

A lock nut 25 is in threaded relation with the external threads on the stem 20 and serves to hold said stem and washer members 22, 23 and 24 in engagement with the inner casing 16 whereby an air tight joint with said casing is maintained. A nut 26 surrounding and enclosing nut 25 is also in threaded engagement with the stem 20 the inner wall of said nut being adapted to engage with the lugs 23′ of washer 23 whereby said washer and stem 20 are locked against rotative movement and the stem and washer elements carried thereby held rigid with respect to the casing 13.

The lugs 23′ of the washer 23 are adapted to fit in recesses 25′ within the casing 13 so that the nut 26 forces the lugs 23′ into engagement with said recesses whereby said washer 23 and stem 20 are locked against movement relatively to the casings 13 and 16 and the application of the union member 18 or the exertion of any force or strain on said stem 20 will in no way tend to disrupt the air tight connection between the stem 20 and the casing 16. The lugs 23′ further serve to frictionally engage the lower annular wall of the nut 26 whereby said nut is locked against displacement.

The upper end of the plunger rod 6 extends through an opening in the washer 12 into the cylinder 13 and carries an adjustable piston head 27 having a locking nut 28 adapted to lock said piston head in adjusted position on said rod. The head 27 which may be in the form of a plunger or disk bears against the lower side of the casing 16 and further compresses the air in the compression chamber 14 on its upward movement. As shown in Fig. 1 the front end of the chassis is pivotally connected to the body 5 of the shock absorber through an eye member 29 attached to the arm 30, a suitable brace rod 31 being provided to hold said shock absorber rigid with respect to said chassis while the rear shock absorber has an integral projecting arm 31′ bolted or otherwise attached to the rear portion of the chassis. An arm 32 is pivotally mounted intermediate its ends on the lower end of the sleeve 7. One end of the arm 32 is pivoted to the body portion 5 as shown at the right in Fig. 1 while the other end of said arm is attached to the end of the spring 1 in the case of the front shock absorbing element, a link 33 being provided between said arm and spring 1 in the case of the rear shock absorbing element.

Figure 2:
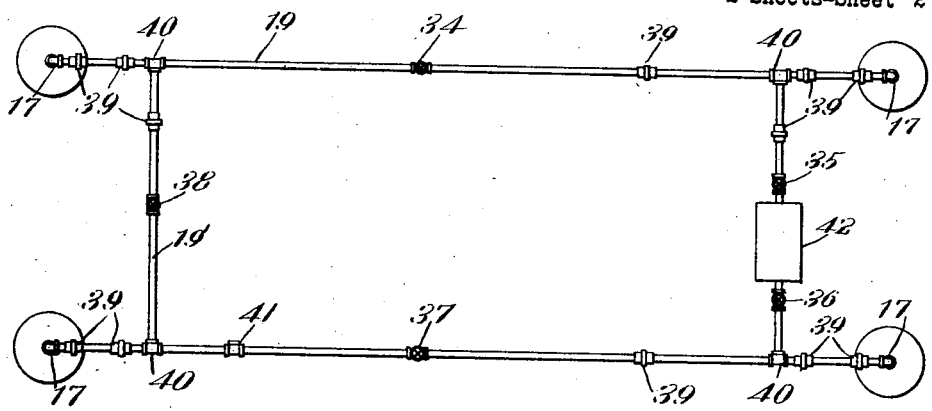
Fig. 2 is a diagrammatic plan view of the shock absorbers and connections therebetween.

As diagrammatically illustrated in Fig. 2 the tubing 19 which may be of flexible material if desired connects the Y branch members 18 of front and rear shock absorbing elements together so that the pressure within the compression chamber of either of the shock absorbing elements may be transmitted to the other of said shock absorbing elements. Transverse tubing or piping 19′ is provided to connect the longitudinal tubing 19 adjacent the front and rear shock absorbing elements, suitable control valves 34, 35, 36, 37, and 38 are provided within the tubing 19 and 19′ so that different predetermined normal pressures may be maintained in each of the shock absorbing elements. Furthermore the valves 34, 35, 36, 37, 38 are manually operable so that any one of the shock absorbing elements may be rendered inoperative without affecting the pressure in any of the other of said shock absorbing elements. The numeral 39 designates unions for connecting the portions of the tubing or piping while the numeral 40 designates T members for connecting the tubing 19 and 19′, a plugged T 41 being provided for testing and filling purposes. A fluid reservoir 42 may be conveniently located within the tubing 19 and 19′ with suitable control valves therefor if desired. It will be understood that the compression chambers 14 are adapted to contain gas such as air, tetrachloride, carbona, ether, hydrogen, helium, ammonia, or liquids such as water, alcohol, oil, etc. and that the normal pressures in the front and rear shock absorbing elements may vary in accordance with the weight of the vehicle from substantially equal pressures to widely diverging pressures which would be controlled by use of valves or different sized helical springs so that if for instance the normal pressure in the front shock absorbing elements is 50 lbs. and in the rear 32 lbs. said pressures will be maintained constant when the chassis and springs are normally separated under ordinary load.

The operation of the device is as follows:

When the vehicle on which the device is mounted sustains a shock it is transmitted to the leaf springs 1 and 2 and the plunger rod 6 attached thereto through the arm 32 so that said rod will move upwardly within the compression chamber 13 with the result that the chassis 3 is moved upwardly. Any movement of the leaf spring 1 will necessarily impart a movement to the plunger rod 6 and the arm 32 which is mounted on both the leaf spring and plunger rod. While the action above described serves to effectively counteract and neutralize the shocks received by a vehicle so that shocks are very lightly transmitted to the occupants thereof the aforesaid parts alone do not overcome the tendency of the front and rear parts of the vehicle to separately react to individual shocks and assume an undulating or loping movement. When however a shock is sustained by the front end or corner of the vehicle the upward movement of the piston causes the pressure within the compression chamber 14 to rise and the front end of the chassis to move upwardly so that this increased pressure is transmitted to the rear compression chamber 14 and other compression chambers causing the rear end and other portions of the chassis 2 to correspondingly rise in accordance with the rise of the front end of the chassis. The above described action is the same whether the original shock is sustained by the front or rear end of the vehicle.

It will be understood that the structure above described merely illustrates one practical embodiment of the invention whereby the shocks sustained by a vehicle are effectively absorbed and the undulating or loping movement of said vehicle overcome. It is not intended to be limited to the structural details shown and described but said structure may be altered to embrace any mechanical arrangement constituting an equivalent structure to that above described.

I claim:

1. A chamber adapted to contain compressed air comprising an outer casing, an inner casing of resilient material, a valve for inflating said casing, and means forming an air tight connection between said valve and casing comprising a stem having a flange bearing against the interior surface of the casing, a washer bearing against the exterior surface of the casing, and a lock washer having upstanding lugs engaging a nut on said stem.

2. A chamber adapted to contain compressed air comprising an outer casing, an inner casing of resilient material, a valve for inflating said casing, a stem connected to said valve having a flange bearing against the interior surface of said inner casing, a washer bearing against the exterior surface of the inner casing and a lock washer having upstanding lugs engaging recesses within said outer casing whereby a tight connection is formed between said valve and casings and relative movement between said stem and casing is prevented.

3. In a shock absorbing system for vehicles, a plurality of individual shock absorbing elements interposed between the frame and axles thereof, each element comprising a collapsible chamber containing a compressible fluid, a coil spring normally under compression acting in tandem with each collapsible chamber, a plunger adapted to be moved by a relative movement of the frame and axles to collapse the chamber and compress the fluid therein, and means connecting the chambers of the various absorbers to distribute to the various absorbers the pressure change caused by a shock initially unequally sustained by the different parts of the vehicle.

Signed by me at Lowell, Massachusetts, this twenty-eighth day of September, 1925.

JOHN A. STEVENS.